United States Patent
Virgilio

(10) Patent No.: US 6,736,884 B2
(45) Date of Patent: May 18, 2004

(54) AIR/OIL SEPARATION TANK

(76) Inventor: Mietto Virgilio, Via Como, 17, 36051 Olmo Di Creazzo (Vincenza) (IT)

(*) Notice: Subject to any disclaimer, the term of this patent is extended or adjusted under 35 U.S.C. 154(b) by 0 days.

(21) Appl. No.: 10/237,762

(22) Filed: Sep. 9, 2002

(65) Prior Publication Data

US 2003/0074870 A1 Apr. 24, 2003

(30) Foreign Application Priority Data

Oct. 18, 2001 (IT) ...................................... VI2001A0216

(51) Int. Cl.$^7$ ................................................. B01D 45/12
(52) U.S. Cl. ........................ 96/189; 55/434.2; 55/434.4; 55/426; 55/452; 55/459.1
(58) Field of Search ..................... 96/188, 189; 55/424, 55/426, 434.2, 434.3, 434.4, 459.1, 452; 417/313

(56) References Cited

U.S. PATENT DOCUMENTS 5,170,640 A * 12/1992 Heitmann et al. ............ 62/470
5,676,717 A * 10/1997 Cope et al. .................. 55/321

FOREIGN PATENT DOCUMENTS

JP 08144982 A * 6/1996

* cited by examiner

*Primary Examiner*—Robert A. Hopkins
(74) *Attorney, Agent, or Firm*—Bucknam & Archer

(57) ABSTRACT

An air/oil separation tank for installation in a circuit for the production of compressed air, the circuit including an intake regulator (1) which intercepts external air and sends the air to an oil bath spin compressor (2) which is activated by an electric motor (3). The pressurized air/oil mixture produced by the compressor, passes through conduit (4) to enter separation tank (5) in which the separation of the oil from the air occurs. The air under pressure passes through radiator (6) and fills accumulation tank (7) waiting to be used, while the oil (8) deposited at the bottom of the separator, is picked up by conduit (9) and passes through radiator (10) to be brought again to compressor (2). This separation tank is characterized by the fact that the entry port of the air/oil mixture is placed on the upper wall or cover of the vessel.

11 Claims, 4 Drawing Sheets

AIR/OIL SEPARATION TANK

FIELD OF THE INVENTION

The present invention relates to an air/oil separation tank, particularly suitable for carrying out the separation of air and oil in a compressed air distribution installation.

BACKGROUND OF THE PRIOR ART

It is well known that in industrial applications, an installation for the production of compressed air comprises essentially an oil bath spin compressor, an air/oil separator or separation tank, a tank for the accumulation of compressed air, radiators for the air and oil and the necessary operating and control valves. In more detail, the air/oil separation tank is installed below the compressor from which it receives the fluid under pressure which is constituted by a mixture of air and oil, and above the radiators for the oil and air when the two elements have been separated.

At the present state of the art, the air/oil separation tank is constituted essentially by a vessel with a cylindrical section where the fastening of the entry conduit of the mixture is carried out on the lateral wall of the tank and with a coaxial conduit in the interior which deflects the entering fluid towards the lower part of the the collector which contains a filter having the function of finally separating the air from the oil.

In operation, the separation of the oil component of the system is accomplished by gravity, because the small drops of oil contained in the gaseous current generated in the container have an upward speed less than air so that they become deposited at the bottom of the container. Therefore, the degree of separation of air and oil depends on the capacity of the apparatus to minimize the creation of turbulent motions so as to reduce to a minimum the formation of a mist or fog and therefore to allow a better separation of the liquid particles, that is the small oil drops from the air component.

This function is carried out by the internal annular collector which functions as a screen to the entry of the mixture in the container in a manner to cause the necessary vortex motions for the separation of the liquid portion from the air.

This method has at least two drawbacks. The first drawback resides in the impossibility of achieving the separation of oil from air to a high degree, so that it becomes necessary to use air/oil separating filters of a substantial size.

The second drawback resides in the fact that during the separation the temperature of the mixture is high because of the heating of the walls of the internal coaxial conduit so that a high temperature is registered also in the interior of the separating tank, a fact which necessitates the use of oil and air radiators of large dimensions, a fact which causes the maintenance (substitution of filters and cleanliness of radiators) to be more difficult and increases the cost of each apparatus.

SUMMARY OF THE INVENTION

An object of the present invention is to provide an air/oil separation tank which allows a high degree of separation of the two components of the mixture.

A further object of the invention is to provide a separating tank which requires the use of air/oil separating filters of minimal dimensions.

Another object of the invention is to provide a separation tank which does not require the use of a radiator for the oil and which requires at the same time a radiator for the air of reduced dimensions.

Still another object of the invention is to provide a separation tank of simple construction and which requires only minimum maintenance.

These objects are achieved with an air/oil separation tank characterized by the fact that the entry port of the of the mixture is located on the upper wall or cover of the container. In addition, advantageously, on the entry port is applied a suitable nozzle which introduces tangentially the fluid current, impressing on it a centrifugal effect along the wall of the tank with minimal formation of mist or fog.

BRIEF DESCRIPTION OF THE DRAWINGS

These and other characteristics of the invention, both constructive and in actual function, will be more evident by the description provided by way of non-limiting examples, of possible embodiments, by means of the attached drawings of which.

DETAILED DESCRIPTION OF THE INVENTION

Figure 1:
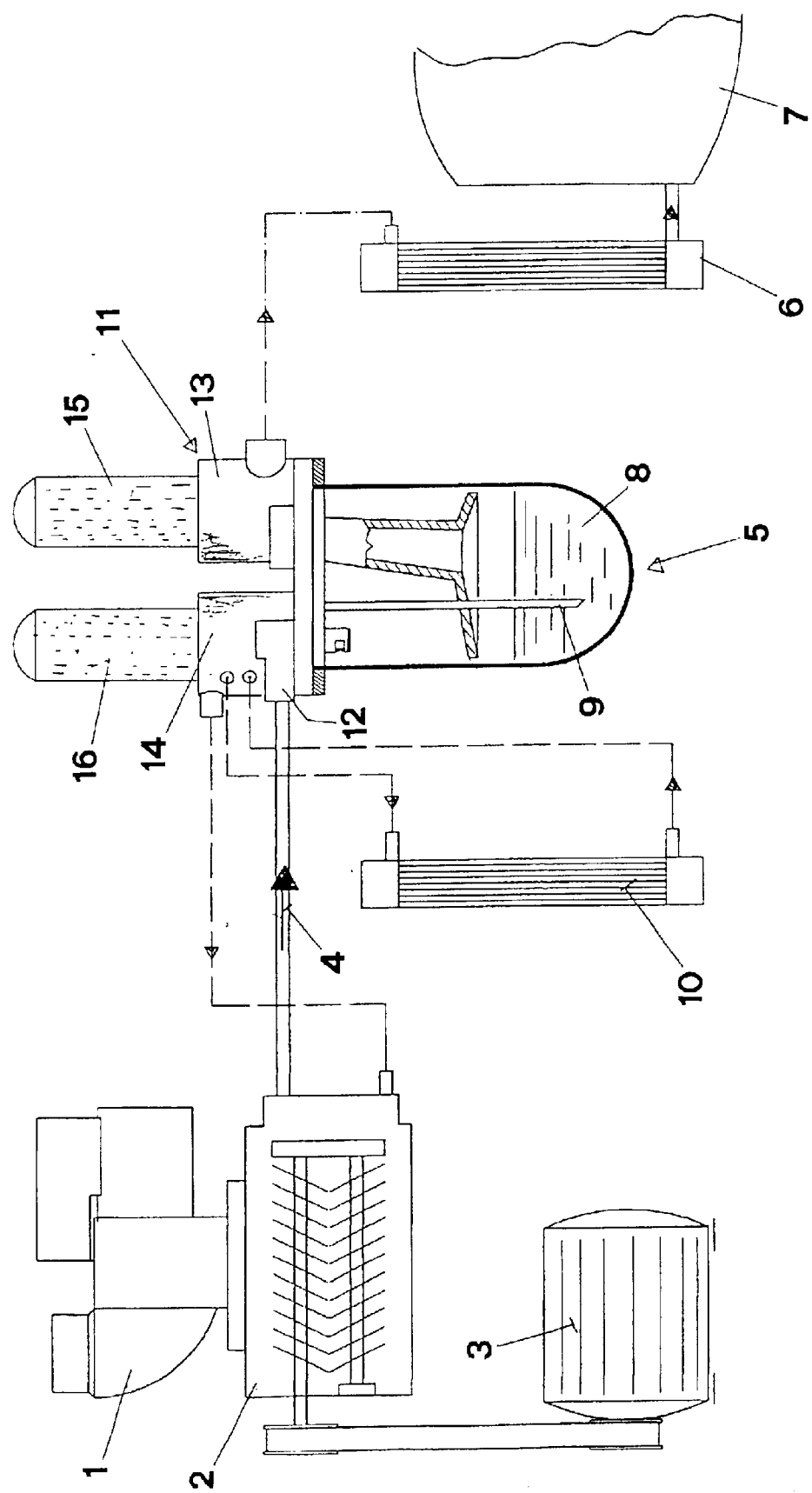
FIG. 1 is a diagram of an installation for the production of compressed air by means of an oil bath spin compressor including the separation tank of the invention.

FIG. 1 shows that the installation for the production of compressed air is composed of an intake regulator (1), which intercepts external air and directs it to the oil bath spin compressor (2), the compressor being activated by electric motor (3).

The pressurized air/oil mixture produced by the compressor, enters through conduit (4) into the separation tank (5) where the separation of the oil from the air occurs. The pressurized air then passes through radiator (6) and goes to fill accumulation tank (7) waiting to be used, while the oil (8) deposited at the bottom of the separation tank is picked up by conduit (9) and passes through radiator (10) to be brought in circulation again in compressor (2).

The separation tank (5) is of the type which comprises on the cover a connection (12) of the intake of the air/oil mixture, the air/oil separating group (13) and the oil regulation group (14), as well as the corresponding air filter (15) and oil filter (16).

Figure 2:
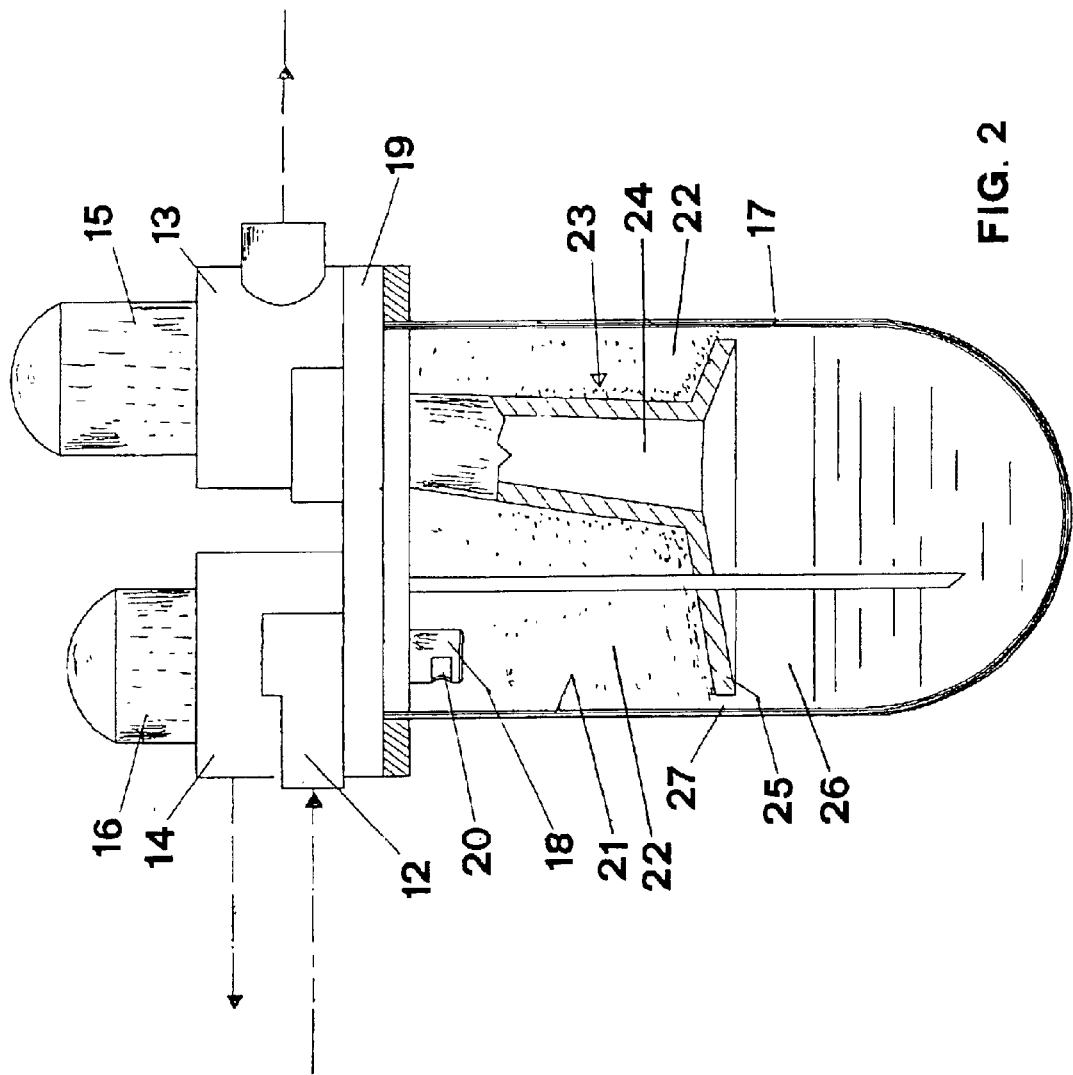
FIG. 2 is a front elevational view in cross-section of a first embodiment of the separation tank of the invention.

FIG. 2 shows that the first characteristic of novelty of the invention is constituted by the fact that the mixture of air/oil is introduced in the interior of container (17) by means of nozzle (18) which is applied on cover (19), rather than through an opening formed on the lateral wall of the container, as it is carried out in common separators. By means of this constructive solution and forming on the nozzle (18) an orifice (20), suitably shaped and oriented, the mixture of air/oil under pressure which exits from the orifice (20) goes to hit in a manner substantially tangential the opposite wall (21) of the container, thus generating a fluid current provided with an helicoidal motion which expands itself along the wall of the tank. The minimal amount of fog which is formed within the annular chamber (22) becomes deposited along the walls of the internal conduit (23). The second characteristic of novelty of the invention is the profile of this internal conduit (23). In fact, as shown in FIG. 2, this conduit (23), in addition to having a conformation slightly truncated-conical (24), which makes it easier sending the separated air towards the discharge, is provided in the lower part with base (25) so as to separate the annular chamber (22) where the air/oil mixture is located, from the lower oil collection chamber (26), these chambers being intercommunicating only through lamellar opening (27).

This constructive solution allows to have an annular chamber (22) which is very large so that the gaseous fog expands substantially and therefore makes the separation of the small oil drops easier, the oil drops being deposited along the walls of the container and the conduit, the oil drops then being sent along the walls of the container and the conduit to the lower oil collection chamber through opening (27).

Tests carried out in the laboratory and in installations have shown that by means of the separation tank of the invention it is possible to obtain a very high separation of air and oil, so that it is possible to allow the use of air filters (15) of minimal dimensions, only for a precautional purpose.

The same tests in the laboratory and in installations have shown that the temperature of the air/oil mixture in the interior of the container, due to the centrifugal motion along the walls of the tank, which have the function of diffusing heat toward the exterior, does not reach high values so that it is possible to eliminate the oil radiator (10) inserted in the installation, with a simple fan applied at the base of the tank.

Figure 3:
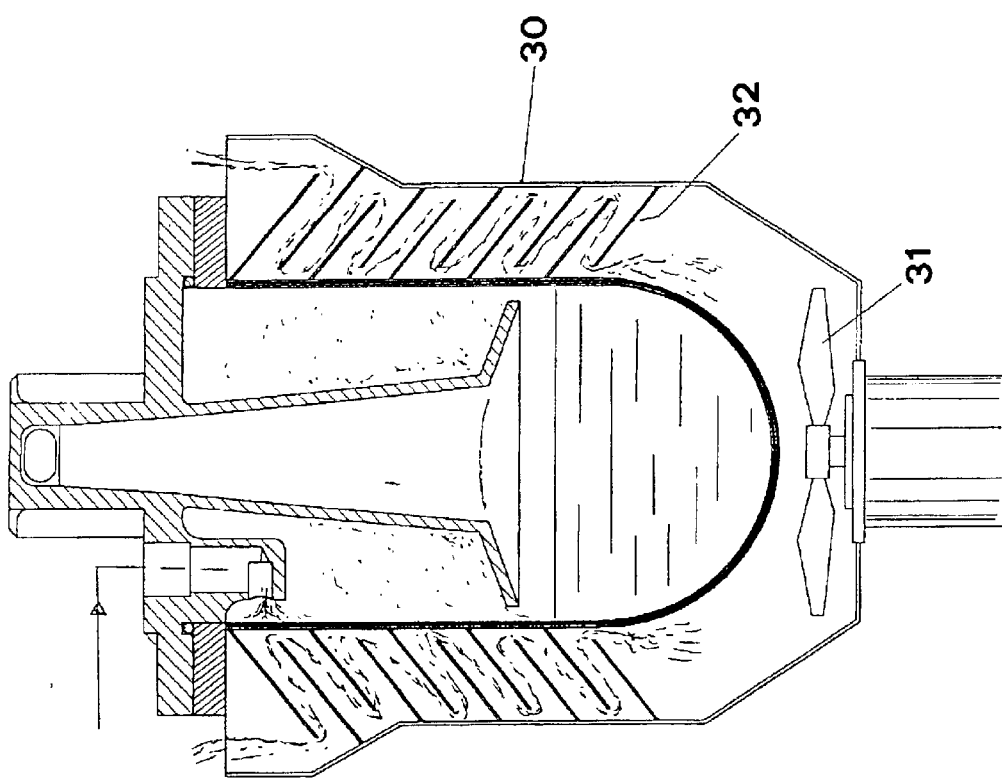
FIG. 3 is a front elevational view in cross-section of a second embodiment of the separation tank of the invention.

Constructively, as shown in FIG. 3, the invention provides that the separating tank described hereinabove be positioned in the interior of a chamber (30) provided at the base with a fan (31). This chamber is provided laterally with fins (32) which send the flux of air against the external wall of container (17) removing in this manner the heat produced by the air/oil mixture located in the interior of the container.

Finally the invention provides that in the case of separation tanks of small dimensions inserted in installations with maximum load of 800 liters/min of compressed air, the expansion chamber of the air/oil mixture is formed on the body of the cover while the container is screwed on the cover.

Figure 4:
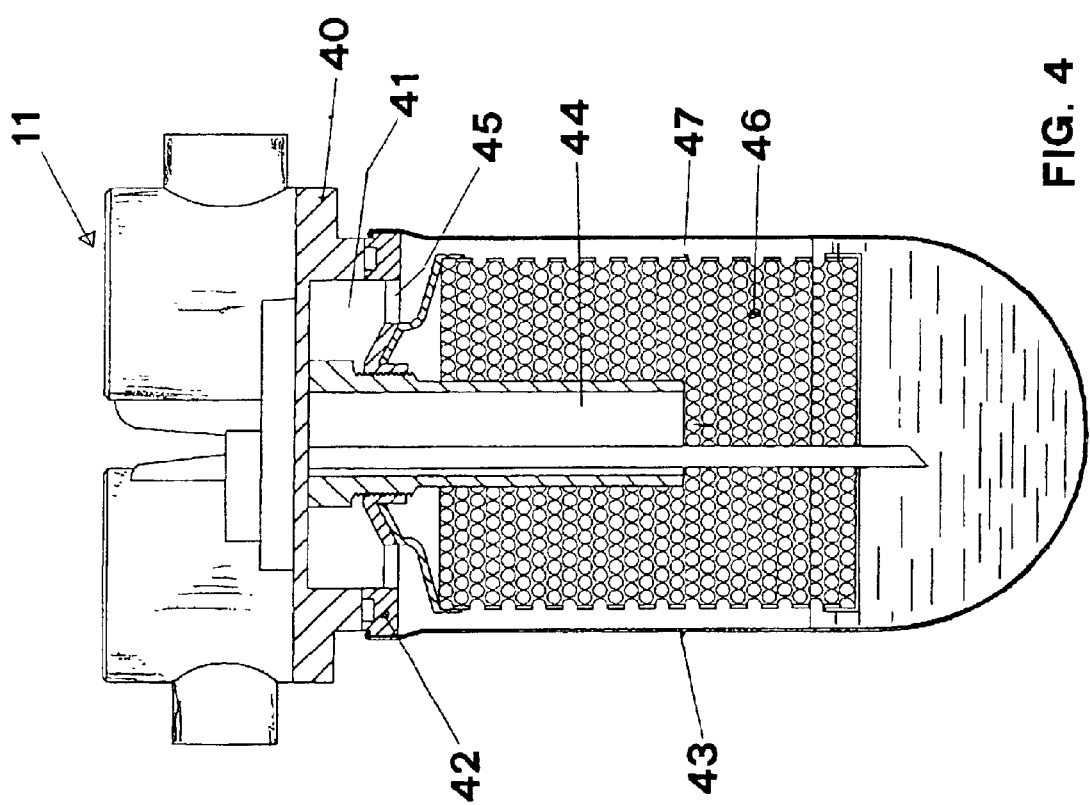
FIG. 4 is a front elevational view in cross-section of a third embodiment of the separation tank of the invention.

Constructively, as shown in FIG. 4, the small dimension separation tank of the invention provides that on the body (40) of the monobloc is formed the annular expansion chamber (41) of the air/oil mixture defined by the same body and by the upper flange (42) of container (43) which is screwed on the internal evacuation conduit (44) for the separated air, the conduit (44) being integral with the body (40).

Orifices (45) place in communication the annular chamber (41) where the centrifugal motion of the current causes a first separation of the air/oil mixture, with the lower chamber (46) where the separation is completed due to coalescence by using wall (47) which has orifices, and which finally separates the small oil drops from the air.

What is claimed is:

1. An air/oil separation tank adapted to be installed in a circuit for the production of compressed air, said circuit including an intake regulator (1) which intercepts external air and directs said air to an oil bath spin compressor (2) activated by an electric motor (3), the air/oil pressurized fluid mixture produced by said compressor enters an air/oil separation tank (5) through a conduit (4) for separation of oil from air, the separated air under pressure passing through a radiator (6) and collecting in an accumulation tank (7) while the separated oil (8) deposited at the bottom of the separation tank is picked up by a conduit (9) and passed through a radiator (10) to be returned to said compressor (2), said air/oil separation tank comprising a container (17) and a cover (19) for said container, wherein said cover comprises a monobloc (11) having a connection (12) for the air/oil mixture, an air separating group (13), an oil regulation group (14) and corresponding air and oil filters, and a nozzle (18) through which the air/oil mixture is introduced to the interior of said container (17).

2. The air/oil separation tank as defined in claim 1, wherein said nozzle (18) includes an orifice (20) shaped and oriented so that the pressurized air/oil mixture exiting said orifice strikes an opposite wall (21) of said container (17) substantially tangentially generating a fluid current having a helicoidal motion and which causes a minimal quantity of fog, said fog expanding to fill an annular chamber (22) defined by said wall (21) and an internal conduit (23), said internal conduit (23) passing the separated air to said radiator (6) and accumulation tank.

3. The air/oil separation tank as defined in claim 2, wherein said internal conduit (23) is shaped so as to allow the gaseous fog to cling on the external wall of said conduit and flow towards the bottom of said container.

4. The air/oil separation tank as defined in claim 3, wherein said internal conduit (23) is provided at a lower end with a base (25) which separates said annular chamber (22) from a lower oil collection chamber (26), and said conduit (23) has a truncated-conical shape (24) so as to ease the movement of separated pressurized air from the container (17).

5. The air/oil separation tank as defined in claim 4, wherein said annular chamber (22) and oil collection chamber (26) intercommunicate through a lamellar opening (27).

6. The air/oil separation tank as defined in claim 4, wherein said annular chamber (22) is sized so that the gaseous fog expands substantially thereby facilitating the separation therefrom of small drops of oil, said drops of oil being deposited due to their vorticose motion along the walls of the container and the conduit to be sent into the lower oil collection chamber.

7. The air/oil separation tank as defined in claim 1, wherein said air/oil separation tank (5) is disposed within a chamber (30) having a fan (31) arranged in the base thereof.

8. The air/oil separation tank as defined in claim 7, wherein said chamber (30) is provided with laterally arranged fins (32) which direct the flux of air generated by said fan (31) against an external wall of said separation tank thereby removing the heat therefrom which has been transferred from the air/oil mixture within the separation tank.

9. The air/oil separation tank as defined in claim 1, wherein said monobloc (11) includes a body (40) having an annular expansion chamber (41) for the air/oil mixture formed therein and defined by said body (40) and an upper flange (42) of a container (43).

10. The air/oil separation tank as defined in claim 9, wherein said container (43) is threadedly engaged with an internal conduit (44) for evacuation of the separated air, said internal conduit (44) being integral with said body (40) of said monobloc (11).

11. The air/oil separation tank as defined in claim 9, which further comprises orifices (45) which place annular chamber (41) in communication with a lower chamber (46) in said container (43), and a wall (47) disposed in said lower chamber (46) and having orifices therein, whereby the centrifugal motion of the fluid current in said annular chamber (41) causes a first separation of the air/oil mixture and separation of the air/oil mixture is completed in said lower chamber (46) due to coalescence by said wall (47).

* * * * *